US012686816B2

(12) United States Patent
Wallace et al.

(10) Patent No.: US 12,686,816 B2
(45) Date of Patent: Jul. 21, 2026

(54) THERMAL BARRIER COATINGS

(71) Applicant: General Electric Company, Schenectady, NY (US)

(72) Inventors: Margeaux Wallace, Niskayuna, NY (US); Mamatha Nagesh, Bangalore (IN); Mohandas Nayak, Bangalore (IN); Sundeep Kumar, Bangalore (IN); Bernard Patrick Bewlay, Niskayuna, NY (US); Julie Marie Kuhn, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 690 days.

(21) Appl. No.: 18/068,153

(22) Filed: Dec. 19, 2022

(65) Prior Publication Data

US 2023/0330700 A1 Oct. 19, 2023

(30) Foreign Application Priority Data

Apr. 14, 2022 (IN) .............................. 202211022293

(51) Int. Cl.
*C09K 11/08* (2006.01)
*B05D 1/12* (2006.01)
(52) U.S. Cl.
CPC ............ *C09K 11/0822* (2013.01); *B05D 1/12* (2013.01); *B05D 2301/10* (2013.01)
(58) Field of Classification Search
None
See application file for complete search history.

(56) References Cited

U.S. PATENT DOCUMENTS

| | | | |
|---|---|---|---|
| 6,746,755 B2 | 6/2004 | Morrison et al. | |
| 7,150,921 B2 | 12/2006 | Nelson et al. | |
| 7,354,663 B2 | 4/2008 | Torigoe et al. | |
| 7,476,450 B2 | 1/2009 | Maloney et al. | |
| 9,581,041 B2 | 2/2017 | Sinatra et al. | |
| 2006/0280955 A1* | 12/2006 | Spitsberg | C23C 4/18 |
| | | | 427/446 |
| 2015/0233256 A1 | 8/2015 | Anand et al. | |
| 2016/0168684 A1 | 6/2016 | Brosnan et al. | |
| 2018/0030584 A1 | 2/2018 | Inoue et al. | |
| 2018/0135427 A1* | 5/2018 | Surace | F01D 5/187 |
| 2018/0163062 A1* | 6/2018 | Hoel | C04B 35/62222 |
| 2019/0078215 A1* | 3/2019 | Wessels | C23C 28/3215 |
| 2019/0284673 A1 | 9/2019 | Landwehr et al. | |
| 2021/0025592 A1 | 1/2021 | Nagaraj | |
| 2021/0123124 A1 | 4/2021 | Kudo et al. | |

FOREIGN PATENT DOCUMENTS

| | | | |
|---|---|---|---|
| EP | 3453779 A1 | 3/2019 | |
| WO | WO2015/116300 A2 | 8/2015 | |
| WO | WO2017/196905 A1 | 11/2017 | |

* cited by examiner

*Primary Examiner* — Chinessa T. Golden
(74) *Attorney, Agent, or Firm* — Dority & Manning, P.A.

(57) ABSTRACT

Coated components, along with methods of their formation, are provided. The coated component may include a substrate having a surface and a thermal barrier coating on the surface of the substrate. The thermal barrier coating includes a plurality of elongated surface-connected voids therein, and wherein the thermal barrier coating comprises a plurality of nonspherical particles within a thermal barrier material.

20 Claims, 2 Drawing Sheets

THERMAL BARRIER COATINGS

PRIORITY INFORMATION

The present application claims priority to Indian Patent Application Number 202211022293 filed on Apr. 14, 2022.

FIELD

This present disclosure generally relates to compositions suitable for use as in coating systems on components exposed to high-temperature environments, such as the hot gas flow path through a gas turbine engine. More particularly, the present disclosure is directed compositions for use in a thermal barrier coating (TBC) system.

BACKGROUND

Gas turbine engines typically include an inlet, a fan, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. The use of thermal barrier coatings (TBC) on components such as combustors, high pressure turbine (HPT) blades and vanes of gas turbine engines is increasing.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
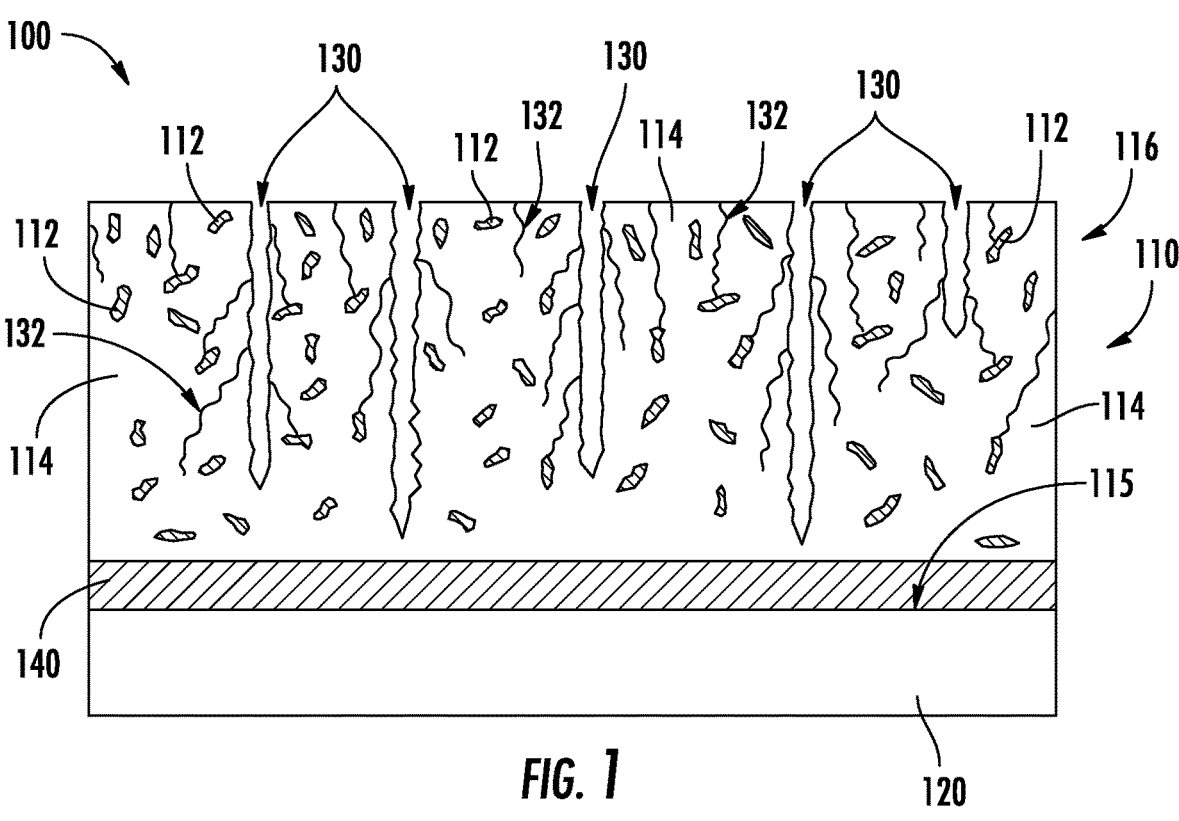
FIG. 1 is a cross-sectional schematic of an exemplary coated component in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, a "caliper diameter" (also known as a "Feret diameter") is a measure of an object size along a specified direction. In general, it can be defined as the distance between the two parallel planes restricting the object perpendicular to that direction.

As used herein, the term "aspect ratio" of a particle refers to the length of the largest caliper diameter of the particle divided by the length of the smallest caliper diameter of that same particle. For example, a circular particle would have an equal length all around the particle, and thus would have an aspect ratio of 1. In another example, a microparticle having a caliper diameter in its largest dimension of 100 micrometers ($\mu$m) and a caliper diameter in its smallest dimension of 10 $\mu$m would have an aspect ratio of 10 (i.e., 100 $\mu$m divided by 10 $\mu$m is 10). It is noted that the aspect ratio is agnostic to measurement units, as the formula cancels out the particular units utilized to measure the length, as long as the measuring units are the same.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines. Ceramic thermal barrier coatings are designed to have low thermal conductivity. To reduce the thermal conductivity, microstructural and compositional changes to the thermal barrier coating can be made.

Generally, the thermal insulation of a TBC enables such components to survive higher operating temperatures, increases component durability, and improves engine reliability. In order for a TBC to remain effective throughout the planned life cycle of the component it protects, it is desired that the TBC has a low thermal conductivity throughout the life of the component, including high temperature excursions. Additionally, it is desired that the TBC has a high toughness which reduces the damage due to erosion and impact on rotating components of HPT, combustor components, and static turbine components (e.g., turbine nozzles). Low thermal conductivity TBCs can increase engine efficiency by reducing heat loss and potentially allowing higher temperature operation.

Current thermal barrier materials (e.g., 8YSZ) may be applied to form a coating on the component using a plasma spray process, such as air-plasma spray (APS), suspension plasma spray (SPS), solution precursor plasma spray (SPPS), etc. For example, a coating formed by SPS may have a columnar microstructure that has a high porosity, leading to a lower thermal conductivity but also limiting the erosion resistance and toughness of the coating. Thus, further improvements in TBC technology are desirable, particularly as TBC's are employed to thermally insulate components intended for more demanding engine designs.

Coated components, along with their methods of production, are generally provided that have a thermal barrier coating including a plurality of elongated surface-connected voids. Generally, the plurality of elongated surface-connected voids may be referred to as a columnar microstructure and/or as a dense, vertically cracked microstructure without intending to limit or change the meaning of the plurality of elongated surface-connected voids. In particular, when the columnar microstructure is formed from a thermal barrier material, such as a ceramic thermal barrier material, to include the plurality of elongated surface-connected voids within the microstructure to increase the cyclic life. Without wishing to be bound by any particular theory, it is believed that the columnar microstructure, when formed with a thermal spray process, leads to a lower thermal conductivity of the coating when compared to a similar coating without the intercolumn porosity. Thus, the coating can be formed with the same material but with a lower thermal conductivity due to the size and shape of the intercolumn porosity. Some thermal barrier coatings do not have surface connected voids and instead form a more continuous coating, with internal porosity and or horizontal micro-cracks. These thermal barrier coatings can be deposited with either thermal spray techniques such as air plasma spray, or room temperature spray techniques, where particles are sprayed at room temperature. Although the cyclic life is not as great as a comparative coating with a columnar microstructure, these coatings can be used in parts of the engine where maximum cyclic life is not required.

Additionally, chemical compositions can be chosen to reduce the materials inherent thermal conductivity. However, most of these materials only have moderate fracture toughness.

In particular embodiments, the thermal barrier coating also includes a plurality of surface-connected microporosity cracks within the thermal barrier coating, with each of the surface-connected microporosity cracks extending to the surface or to one of the elongated-surface connected voids. When present, the surface-connected microporosity cracks create aligned surface connected porosity within a column-like structure defined between adjacent elongated-surface connected voids. This microstructure may help reduce the thermal conductivity further. It is noted that the microporosity cracks are generally distinguishable from the elongated-surface connected voids in size (i.e., volume) in that each microporosity crack is significantly smaller in size than each elongated-surface connected void. However, there may be a larger number of the microporosity cracks within the coating than the number of elongated-surface connected voids.

A plurality of nonspherical particles are also included within a thermal barrier material to increase the fracture toughness of the resulting component, as discussed in greater detail below. In one embodiment, the coating may have a relatively low thermal conductivity (e.g., less than 1.8 W/mK at 1000° C., such as 0.5 W/m-K to 1.5 W/m-K at 1000° C., such as 0.5 W/m-K to 1.0 W/m-K at 1000° C., in a 95-100% dense puck as measured via a laser flash method according to ASTM E1461-13). Generally, these compositions may be used to form a layer of a TBC that has an ultra-low thermal conductivity, along with suitable toughness (e.g., an indentation fracture toughness of 2 MPa-m$^{0.5}$ to 3 MPa-m$^{0.5}$ in a 95-100% dense puck).

Referring to FIG. 1, a coated component 100 in accordance with one embodiment of the present disclosure includes a thermal barrier coating 110 disposed on a surface 115 of a substrate 120. In one embodiment, the thermal barrier coating 110 generally includes a plurality of non-spherical particles 112 within a thermal barrier material 114. As used herein, the term "nonspherical" refers to a particle having a shape other than a sphere, and particularly as a shape having at least one dimension that is greater than another dimension. For example, nonspherical particles may have an irregular shape, an ellipsoidal shape, a flake-like shape, etc. The plurality of nonspherical particles 112 may be randomly dispersed within the coating such that the thermal barrier coating 110 includes a generally equal distribution of the nonspherical particles 112 therein.

The thermal barrier coating 110 has a columnar microstructure 116 that includes surface-connected voids 130. As shown, the voids 130 are generally elongated such as having an aspect ratio greater than 1 measured as the longest depth (from the surface 115 to its deepest point within the thermal barrier coating 110) divided by the greatest width within the void 130 parallel to the surface 115. In particular embodiments, the voids 130 have an aspect ratio that is 10 to 100. Without wishing to be bound by any particular theory, it is believed that these voids 130 may help increase the cyclic life of the thermal barrier coating 110 by accommodating thermal expansion strains on the coating 100 over a series of heating and cooling cycles. In some embodiments, voids 130 include substantially vertically oriented (from the perspective of a cross-sectional view as in FIG. 1, that is extending generally perpendicular from the surface 115 of the substrate 120) cracks and/or boundaries of grains or other microstructural features. The elongated surface-connected voids 130 may be present due to inherent characteristics of deposition processes used to deposit the thermal barrier coating 110; some elongated surface-connected voids 130 may also form after deposition due to normal wear and tear during operation.

In certain embodiments, the thermal barrier coating 110 may also include a plurality of surface-connected microporosity cracks 132 that are connected to the surface 115 or to at least one of the plurality of elongated surface-connected voids 130. Without wishing to be bound by any particular theory, it is believed that the plurality of surface-connected microporosity cracks 132 may decrease the thermal conductivity of the thermal barrier coating 110, such as by scattering thermal energy applied to the thermal barrier coating 110. Generally, the surface-connected microporosity cracks 132 are significantly smaller in size (i.e., in volume) than the elongated surface-connected voids 130. For example, the surface-connected microporosity cracks 132 have an average width that is less than 75% of an average width of the elongated surface-connected voids 130, and/or the surface-connected microporosity cracks 132 have an average depth that is less than 75% of an average depth of the elongated surface-connected voids 130. Thus, in certain embodiments, each of the surface-connected microporosity cracks 132 define a microporosity volume that is less than 50% of the void volume of each of the elongated surface-connected voids 130.

The plurality of nonspherical particles 112 are generally included within the columnar microstructure 116 of the thermal barrier material 114 to increase the fracture toughness and optionally add other functionality to the thermal barrier coating 110. Without wishing to be bound by any particular theory, it is believed that the nonspherical particles 112 embedded within the columnar microstructure 116 may inhibit crack propagation through the thermal barrier material 114. For example, the nonspherical particles 112 may inhibit expansion of the plurality of surface-connected microporosity cracks 132 and/or of the elongated surface-connected voids 130 and/or cracks introduced by impact or thermal cycling during use of the coated component.

In one embodiment, the thermal barrier material 114 forms a majority of the thermal barrier coating 110, in terms of volume percent, such that the thermal barrier material 114 forms the columnar microstructure 116 with the nonspherical particles 112 dispersed therein. In one embodiment, the thermal barrier material 114 forms 50 vol. % to 99 vol % of the thermal barrier coating 110, such as 75 vol. % to 95 vol %. Conversely, the plurality of nonspherical particles 112 may form 1 vol. % to 50 vol % of the thermal barrier coating 110, such as 5 vol. % to 25 vol %.

The plurality of nonspherical particles 112 may generally include a CMAS resistant material. For example, the CMAS resistant material of the nonspherical particles 112 may be a stabilized ceramic material that can sustain a fairly high temperature gradient and may be compatible with the thermal barrier material 114. For example, the nonspherical particles 112 may be formed from materials suitable for TBC layers. For instance, the stabilized ceramic material of the nonspherical particles may be one or more of yttria stabilized zirconia (YSZ, such as 8YSZ) and other rare-earth-stabilized zirconia compositions, lanthanide aluminates, yttria aluminates, mullite ($3Al_2O_3$-$2SiO_2$), alumina, ceria ($CeO_2$), lanthanide rare-earth zirconates, aluminosilicates, rare-earth oxides (e.g., $La_2O_3$, $Nb_2O_5$, $Pr_2O_3$, $CeO_2$), alkaline earth-lanthanide-silicates and metal-glass composites, and combinations thereof (e.g., alumina and YSZ or ceria and YSZ). Besides its high temperature stability, YSZ also has a good combination of high toughness and chemical inertness, and the thermal expansion coefficient of YSZ is a comparatively suitable match to that of the thermal barrier material 114.

In one embodiment, the plurality of nonspherical particles 112 may include a fluorescing compound, such as being doped with a fluorescing compound. For example, suitable fluorescing compounds may include, but are not limited to, cerium, neodymium, praseodymium, europium, samarium, terbium, dysprosium, erbium, titanium, manganese, or bismuth doped rare earth containing materials, such as rare earth zirconates or rare earth oxides. The presence of the fluorescing compound within the nonspherical particles 112 may allow for the measurement of the thickness of the thermal barrier coating 110, at deposition and after use. For instance, the thermal barrier coating 110 may have an initial fluorescent intensity after deposition, which may be monitored throughout the use of the coated component 100. A measurement of reduced fluorescent intensity after use indicates that there is some loss of the thermal barrier coating 110. Thus, the thickness of the thermal barrier coating 110 may be monitored for abrasion and other losses.

Generally, the nonspherical particles 112 have an elongated configuration to inhibit crack proliferation through the thermal barrier material 114. That is, the nonspherical particles 112 define a longest dimension and a shortest dimension that may be utilized to define an aspect ratio by dividing the longest dimension by the shortest dimension. In one embodiment, at least 50% of the plurality of nonspherical particles 112 have an aspect ratio that is greater than 5 (e.g., 5 to 100,000), such as an aspect ratio that is 10 to 10,000. In one particular embodiment, a great majority of the nonspherical particles 112 have such an aspect ratio. For example, at least 90% of the plurality of nonspherical particles 112 may have an aspect ratio that is greater than 5 (e.g., 5 to 100,000), such as an aspect ratio that is 10 to 10,000.

Figure 2:
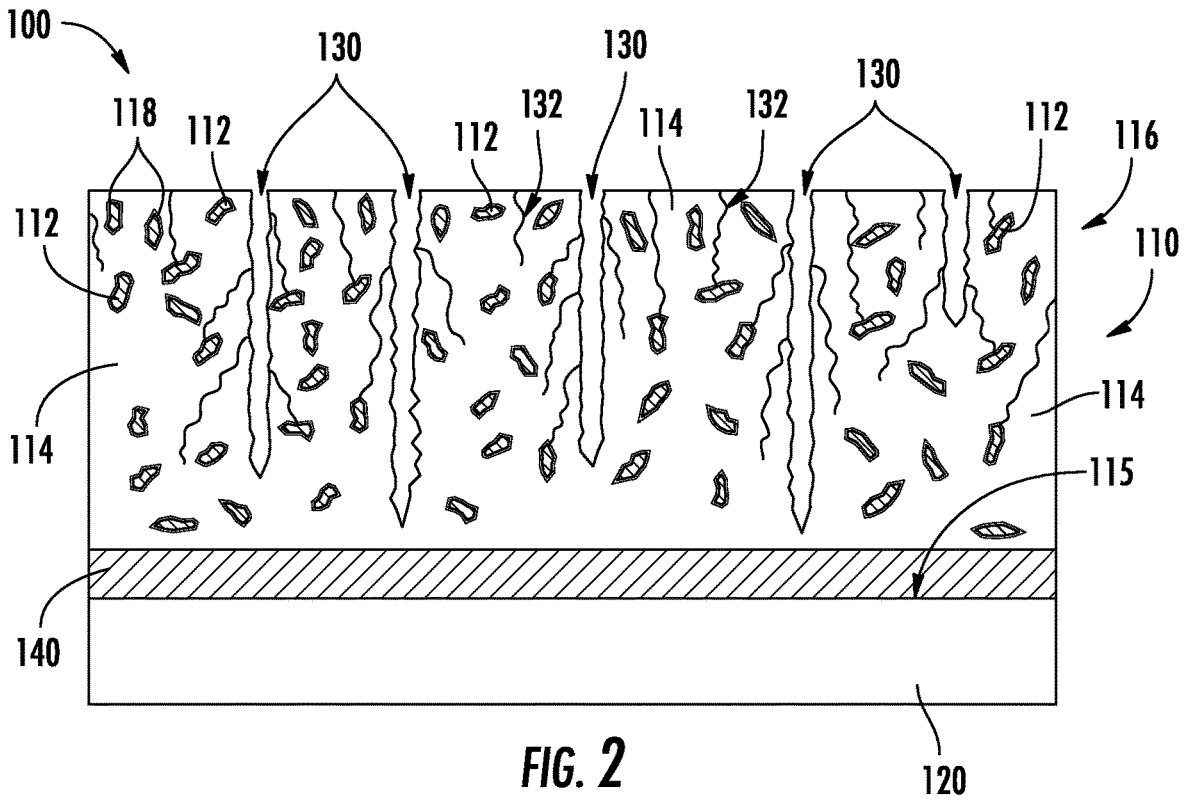
FIG. 2 is a cross-sectional schematic of another exemplary coated component in accordance with an exemplary aspect of the present disclosure.

Referring to the embodiment shown in FIG. 2, the nonspherical particles 112 may have a coating 118 thereon. The coating 118 may include a weakly bonded material (e.g., a phosphate material of the monazite structure, such as $AlPO_4$, $ZrPO_4$, or $LaPO_4$, oxides) that will be stable at high temperatures but create a weak interface with the nonspherical particles 112 to promote interfacial debonding. In particular embodiments, the coating may also include a multilayer coating, such as a boron nitride and an oxygen diffusion barrier (e.g., alumina). For example, the boron nitride may be included for its microstructure, which is believed to have both a weak interface. Alternatively or additionally, the coating 118 may include a fluorescent coating to add or increase the fluorescence indicators on the nonspherical particles 112.

As stated, the thermal barrier coating 110 shown in FIGS. 1 and 2 generally includes a thermal barrier material 114. Suitable thermal barrier material 114 may include, but is not limited to, various types of oxides, such as hafnium oxide ("hafnia") or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

In certain embodiments, the thermal barrier material 114 includes yttria-stabilized zirconia. Suitable yttria-stabilized zirconia may include from 1 weight percent to 60 weight percent yttria (based on the combined weight of yttria and zirconia), and more typically from 3 weight percent to 10 weight percent yttria. An example yttria-stabilized zirconia thermal barrier coating includes 7% yttria and 93% zirconia. These types of zirconia may further include one or more of a second metal (e.g., a lanthanide or actinide) oxide, such as lanthana, ytterbia, samaria, dysprosia, erbia, europia, gadolinia, neodymia, praseodymia, urania, and hafnia, to further reduce thermal conductivity of the thermal barrier material. In some embodiments, the thermal barrier material may further include an additional metal oxide, such as, titania.

Suitable thermal barrier material 114 may also include pyrochlores of general formula $A_2B_2O_7$ where A is a metal having a valence of 3+ or 2+ (e.g., gadolinium, samarium, cerium, lanthanum or yttrium) and B is a metal having a valence of 4+ or 5+ (e.g., hafnium, titanium, cerium or zirconium) where the sum of the A and B valences is 7. Representative materials of this type include gadolinium zirconate, lanthanum titanate, lanthanum zirconate, yttrium zirconate, lanthanum hafnate, cerium hafnate, and lanthanum cerate. Additionally, perovskite materials, following the formula $ABO_3$, can also be used, where the A or B site can contain a single cation or multiple.

The thermal barrier coating 110 may be applied by any thermal spray technique, especially those processes suitable for forming a columnar microstructure 116, or any room temperature spray technique that results in a thermal barrier coating 110 having the desired porosity (e.g., a thermal barrier coating 110 that has 20% porosity by volume or greater). For instance, the thermal barrier coating 110 may be formed by air-plasma spray (APS), suspension plasma spray (SPS), solution precursor plasma spray (SPPS), high velocity oxygen fuel (HVOF), and electrostatic spray assisted vapor deposition (ESAVD). Coatings that are deposited by air plasma spray techniques, for instance, may result in a sponge-like porous structure of open pores in at least the surface of the coating. Under certain deposition conditions, well developed, vertically oriented (relative to the plane of the substrate/coating interface) cracks are also formed by plasma spraying thermal barrier materials. Similarly, thermal barrier coatings that are deposited by physical- or chemical-vapor deposition techniques may result in a structure including a series of columnar grooves, crevices or channels in at least the surface of the coating. A porous structure, especially (though not exclusively) a structure incorporating vertically oriented and/or columnar features as noted above, may be one of the factors that provides for strain tolerance by the thermal barrier coatings during thermal cycling. Further, the porous structure may provide for stress reduction due to the differences between the coefficient of thermal expansion (CTE) of the coating and the CTE of the underlying bond coat layer/substrate.

In one embodiment, the thermal plasma spray process that forms a columnar microstructure utilizing a slurry that is sprayed onto the surface 115 of the substrate 120. The slurry generally includes the thermal barrier material and the plurality of nonspherical particles. In another case, two ceramics slurries can be used, where one is composed of the ceramic matrix material and the second slurry comprised of the coated or uncoated nonspherical particles 112. In some cases, fugitive organics can be included with the ceramics in the slurries in order to provide thermal protection to the nonspherical particles 112 and/or promote porosity in the coating. Additionally, the nonspherical particles 112 and/or ceramic slurries can also contain solution precursors, such as, but not limited to, ethoxides, sulfates, salts or nitrates, in order to provide a coating on the particles in situ.

A bond coat 140 is disposed between thermal barrier coating 110 and substrate 120 in some embodiments. The bond coat 140 may provide functionality, such as adhesion promotion and oxidation resistance, to the coated component 100. In some embodiments, the bond coat 140 comprises an aluminide, such as nickel aluminide or platinum aluminide, or a MCrAlY-type coating well known in the art. These bond coats may be especially useful when applied to a metallic substrate 120, such as a superalloy. In other embodiments, bond coat 140 comprises a silicide compound or elemental silicon, which are often associated with ceramic-based substrates, such as silicon carbide-reinforced silicon carbide ceramic matrix composites (CMC's). Bond coatings 140 may be applied using any of various coating techniques known in the art, such as plasma spray, thermal spray, chemical vapor deposition, or physical vapor deposition.

Coated component 100 may be any component that is subject to service in a high-temperature environment, such as a component of a gas turbine assembly. Examples of such components include, but are not limited to, components that include turbine airfoils such as blades and vanes, and combustion components such as liners and transition pieces. Substrate 120, then, may be any material suitable for use in such applications; examples include nickel-base superalloys, cobalt-base superalloys, and ceramic matrix composites, to name a few. In one particular embodiment, the substrate 120 may be a metal such as steel or superalloys (e.g., nickel-based superalloys, cobalt-based superalloys, or iron-based superalloys, such as Rene N5, N500, N4, N2, IN718, Hastelloy X, or Haynes 188) or other suitable materials for withstanding high temperatures.

The thermal barrier coating 110 may be disposed along one or more portions of the substrate 120 or disposed substantially over the whole exterior of the substrate 120. The thickness of thermal barrier coating 110 may depend upon the substrate 120 it is deposited on. In some embodiments, thermal barrier coating 110 has a thickness in a range of from about 25 μm to about 1000 μm. In some embodiments, thermal barrier coating 110 has a thickness in a range of from about 50 μm to about 750 μm. In some embodiments, the thickness is in a range of from about 50 μm to about 650 μm.

Other layers (not shown) may be present within the thermal barrier coating 110. In one embodiment, another coating layer may be included between the bond coat 140 and the thermal barrier coating 110. One or more of the additional layers may be formed from a stabilized ceramic, as described above with respect to the thermal barrier coating 110, that can sustain a fairly high temperature gradient such that the coated metallic components can be operated at gas temperatures higher than the metal's melting point.

The coated component 100 is particularly suitable for use as a component found in high temperature environments, such as those present in gas turbine engines, for example, combustor components, turbine blades, shrouds, nozzles, heat shields, and vanes. In particular, the coated component 100 may be a component positioned within a hot gas flow path of the gas turbine such that the thermal barrier coating 110 forms a thermal barrier for the underlying substrate 120 to protect the substrate 120 within the gas turbine when exposed to the hot gas flow path.

Figure 3:
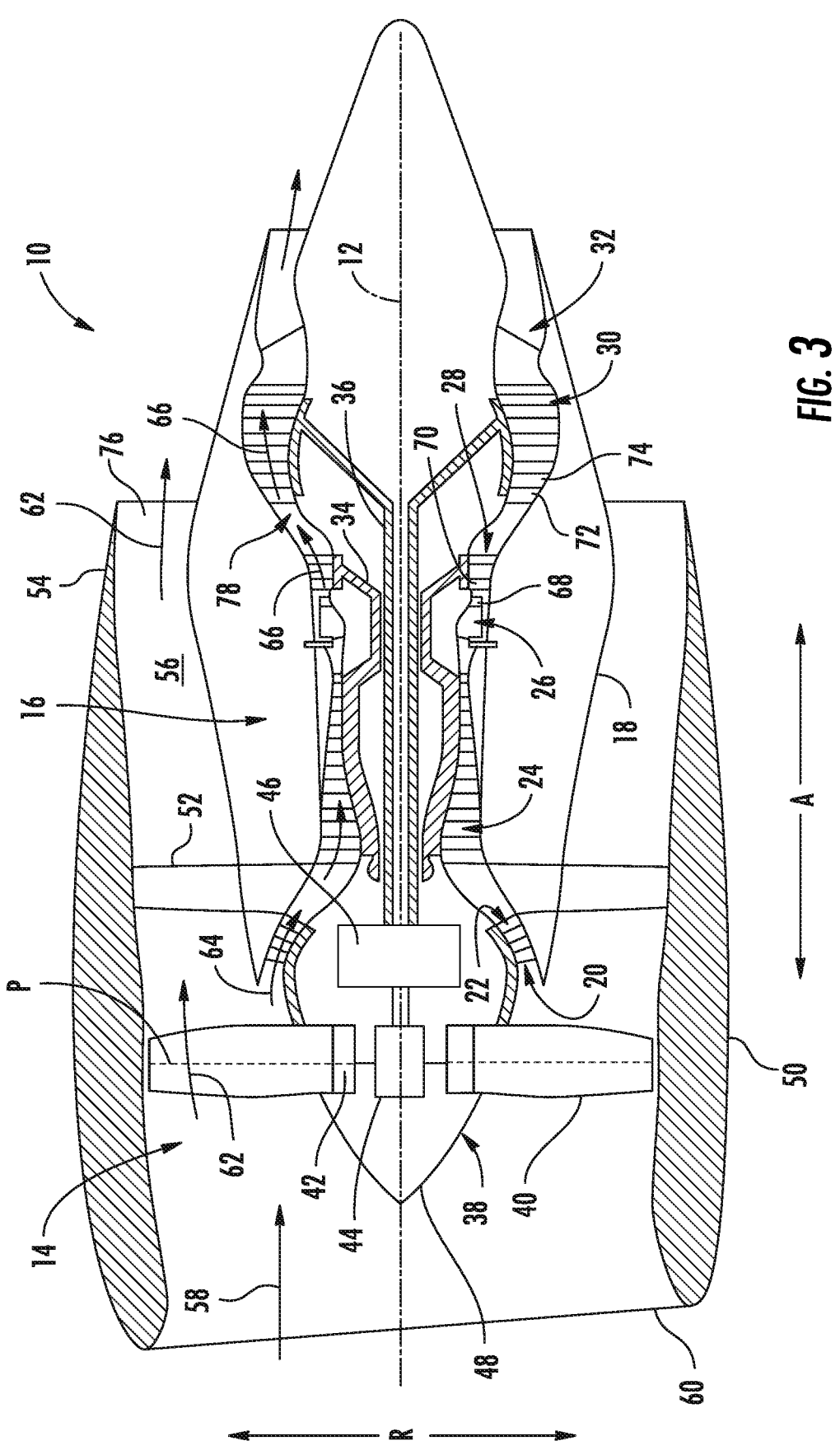
FIG. 3 is a cross-sectional view of a gas turbine engine in accordance with an exemplary aspect of the present disclosure.

As stated above, the coated components 100 are particularly suitable for use in a turbomachine, such as within a hot gas flowpath of a turbomachine. FIG. 3 is a schematic cross-sectional view of a gas turbine engine in accordance with an exemplary embodiment of the present disclosure. More particularly, for the embodiment of FIG. 2, the gas turbine engine is a high-bypass turbofan jet engine 10, referred to herein as "turbofan engine 10." As shown in FIG. 2, the turbofan engine 10 defines an axial direction A (extending parallel to a longitudinal axis 12 provided for reference) and a radial direction R. In general, the turbofan engine 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units. It is also applicable to other high temperature applications that contain water vapor in the gas phase, such as those arising from combustion of hydrocarbon fuels.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 2, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine

16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16. For example, the coated component 100 (FIGS. 1 and 2) may be particularly suitable as a component in contact with the combustion gases 66, including but not limited to, the HP turbine stator vanes 68, the HP turbine rotor blades 70, the LP turbine stator vanes 72, the LP turbine rotor blades 74, components within the combustion section 26 (e.g., a combustion liner), and the like.

Further aspects are provided by the subject matter of the following clauses:

1. A coated component, comprising: a substrate having a surface; and a thermal barrier coating on at least a portion of the surface of the substrate, wherein the thermal barrier coating includes a plurality of elongated surface-connected voids therein, and wherein the thermal barrier coating comprises a plurality of nonspherical particles within a thermal barrier material.

2. The coated component of any preceding clause, wherein the thermal barrier coating further includes a plurality of surface-connected microporosity cracks that are connected to the surface or to at least one of the plurality of elongated surface-connected voids.

3. The coated component of any preceding clause, wherein the thermal barrier coating is a thermally sprayed barrier coating.

4. The coated component of any preceding clause, wherein the thermal barrier material comprises 50 vol. % to 99 vol % of the thermal barrier coating.

5. The coated component of any preceding clause, wherein the plurality of nonspherical particles comprises a CMAS resistant material.

6. The coated component of any preceding clause, wherein the CMAS resistant material comprises rare earth containing oxides.

7. The coated component of any preceding clause, wherein the plurality of nonspherical particles comprises a fluorescing compound.

8. The coated component of any preceding clause, wherein the fluorescing compound comprises oxides doped with materials such as, but not limiting to, Ce, Nd, Pr, Eu, Sm, Tb, Dy, Er, Ti, Mn, and Bi.

9. The coated component of any preceding clause, wherein at least 50% of the plurality of nonspherical particles have an aspect ratio that is greater than 5.

10. The coated component of any preceding clause, wherein at least 50% of the plurality of nonspherical particles have an aspect ratio that is 10 to 10,000.

11. The coated component of any preceding clause, wherein at least 90% of the plurality of nonspherical particles have an aspect ratio that is greater than 5.

12. The coated component of any preceding clause, wherein at least 90% of the plurality of nonspherical particles have an aspect ratio that is 10 to 10,000.

13. The coated component of any preceding clause, wherein the thermal barrier material comprises a stabilized zirconia.

14. The coated component of any preceding clause, wherein the TBC material has a thermal conductivity that is less than 1.8 W/mK at 1000° C.

15. The coated component of any preceding clause, further comprising: a bond coat on the surface of the substrate, the bond coat positioned between the surface of the substrate and the thermal barrier coating.

16. The coated component of any preceding clause, wherein the thermal barrier coating has a thickness of 25 μm to 2000 μm.

17. The coated component of any preceding clause, wherein the plurality of nonspherical particles further comprise a coating thereon.

18. The coated component of any preceding clause, wherein the coating on the plurality of nonspherical particles comprises a monazite phosphate coating, a boron nitride coating, or an inert environmental barrier material coating.

19. The coated component of any preceding clause, wherein the coating on the plurality of nonspherical particles includes a fluorescent indicator.

20. A method of forming the coated component of any preceding clause by thermal plasma spraying, or room temperature spraying, a mixture of a plurality of nonspherical particles and a thermal barrier material to form the thermal barrier coating on at least a portion of the surface of the substrate.

21. A method of forming a coating on a surface of a substrate, the method comprising: thermal plasma spraying, or room temperature spraying, a mixture of a plurality of nonspherical particles and a thermal barrier material to form a thermal barrier coating having a plurality of elongated surface-connected voids therein.

22. The method of any preceding clause, wherein the thermal barrier coating further includes a plurality of surface-connected microporosity cracks that are connected to the surface or to at least one of the plurality of elongated surface-connected voids.

23. The method of any preceding clause, wherein thermal plasma spraying, or room temperature spraying, comprises air-plasma spray (APS), suspension plasma spray (SPS), solution precursor plasma spray (SPPS), high velocity oxygen fuel (HVOF), or electrostatic spray assisted vapor deposition (ESAVD).

24. The method of any preceding clause, wherein the thermal barrier material comprises 50 vol. % to 99 vol % of the thermal barrier coating.

25. The method of any preceding clause, wherein the plurality of nonspherical particles comprises a CMAS resistant material.

26. The method of any preceding clause, wherein the CMAS resistant material comprises rare earth containing oxides.

27. The method of any preceding clause, wherein the plurality of nonspherical particles comprises a fluorescing compound.

28. The method of any preceding clause, wherein the fluorescing compound comprises oxides doped with materials such as, but not limiting to, Ce, Nd, Pr, Eu, Sm, Tb, Dy, Er, Ti, Mn, and Bi.

29. The method of any preceding clause, wherein at least 50% of the plurality of nonspherical particles have an aspect ratio that is greater than 5.

30. The method of any preceding clause, wherein at least 50% of the plurality of nonspherical particles have an aspect ratio that is 10 to 10,000.

41. The method of any preceding clause, wherein at least 90% of the plurality of nonspherical particles have an aspect ratio that is greater than 5.

42. The method of any preceding clause, wherein at least 90% of the plurality of nonspherical particles have an aspect ratio that is 10 to 10,000.

43. The method of any preceding clause, wherein the thermal barrier material comprises a stabilized zirconia.

44. The method of any preceding clause, wherein the TBC material has a thermal conductivity that is less than 1.8 W/mK at 1000° C.

45. The method of any preceding clause, further comprising: a bond coat on the surface of the substrate, the bond coat positioned between the surface of the substrate and the thermal barrier coating.

46. The method of any preceding clause, wherein the thermal barrier coating has a thickness of 25 μm to 2000 μm.

47. The method of any preceding clause, wherein the plurality of nonspherical particles further comprise a coating thereon.

48. The method of any preceding clause, wherein the coating on the plurality of nonspherical particles comprises a monazite phosphate coating, a boron nitride coating, or an inert environmental barrier material coating.

49. The method of any preceding clause, wherein the coating on the plurality of nonspherical particles includes a fluorescent indicator.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A coated component, comprising:
a substrate having a surface; and
a thermal barrier coating on at least a portion of the surface of the substrate, wherein the thermal barrier coating includes a plurality of elongated surface-connected voids therein, and wherein the thermal barrier coating comprises a plurality of nonspherical particles dispersed within a thermal barrier material, and wherein the thermal barrier coating comprises 50 vol. % to 99 vol % of the thermal barrier material and 1 vol. % to 50 vol % of the plurality of nonspherical particles.

2. The coated component of claim 1, wherein the thermal barrier coating further includes a plurality of surface-connected microporosity cracks that are connected to the surface or to at least one of the plurality of elongated surface-connected voids.

3. The coated component of claim 1, wherein the thermal barrier coating is a thermally sprayed barrier coating.

4. The coated component of claim 1, wherein the thermal barrier material comprises 75 vol. % to 95 vol % of the thermal barrier coating.

5. The coated component of claim 4, wherein the plurality of nonspherical particles comprises 5 vol. % to 25 vol % of the thermal barrier coating.

6. The coated component of claim 1, wherein the plurality of nonspherical particles comprises a CMAS resistant material, wherein CMAS refers to a material containing calcium, magnesium, aluminum, silicon or a combination thereof.

7. The coated component of claim 6, wherein the CMAS resistant material comprises rare earth containing oxides.

8. The coated component of claim 1, wherein the plurality of nonspherical particles comprises a fluorescing compound.

9. The coated component of claim 8, wherein the fluorescing compound comprises oxides doped with materials including Ce, Nd, Pr, Eu, Sm, Tb, Dy, Er, Ti, Mn, and or Bi.

10. The coated component of claim 1, wherein at least 50% of the plurality of nonspherical particles have an aspect ratio that is greater than 5.

11. The coated component of claim 1, wherein at least 50% of the plurality of nonspherical particles have an aspect ratio that is 10 to 10,000.

12. The coated component of claim 1, wherein at least 90% of the plurality of nonspherical particles have an aspect ratio that is greater than 5.

13. The coated component of claim 1, wherein at least 90% of the plurality of nonspherical particles have an aspect ratio that is 10 to 10,000.

14. The coated component of claim 1, wherein the thermal barrier material comprises a stabilized zirconia.

15. The coated component of claim 1, wherein the thermal barrier material has a thermal conductivity that is less than 1.8 W/mK at 1000° C.

16. The coated component of claim 1, further comprising:
a bond coat on the surface of the substrate, the bond coat positioned between the surface of the substrate and the thermal barrier coating.

17. The coated component of claim 1, wherein the thermal barrier coating has a thickness of 25 μm to 2000 μm.

18. The coated component of claim 1, wherein the plurality of nonspherical particles further comprise a coating thereon.

19. The coated component of claim 18, wherein the coating on the plurality of nonspherical particles comprises a monazite phosphate coating, a boron nitride coating, or an inert environmental barrier material coating.

20. The coated component of claim 18, wherein the coating on the plurality of nonspherical particles includes a fluorescent indicator.

* * * * *